W. T. ROLLINS.
ANTISKID ATTACHMENT FOR ELASTIC TIRES.
APPLICATION FILED MAR. 25, 1922.
1,423,026.  
Patented July 18, 1922.
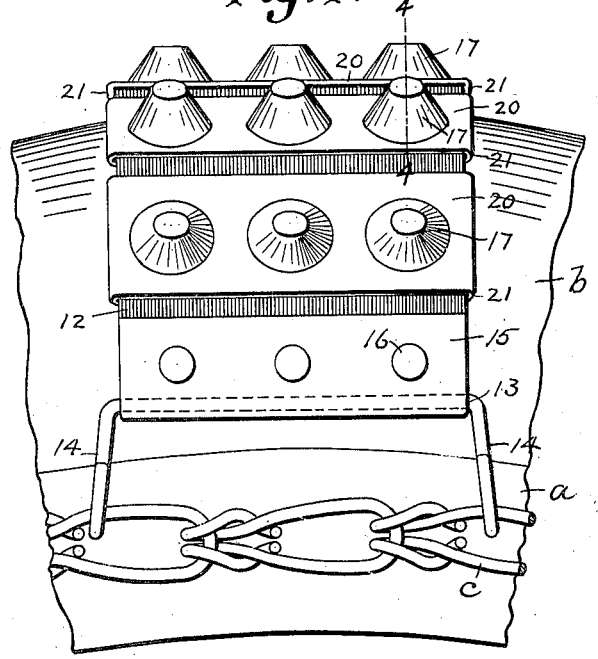
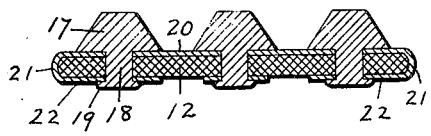
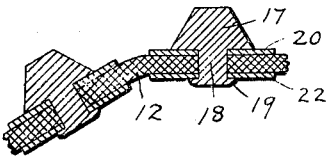
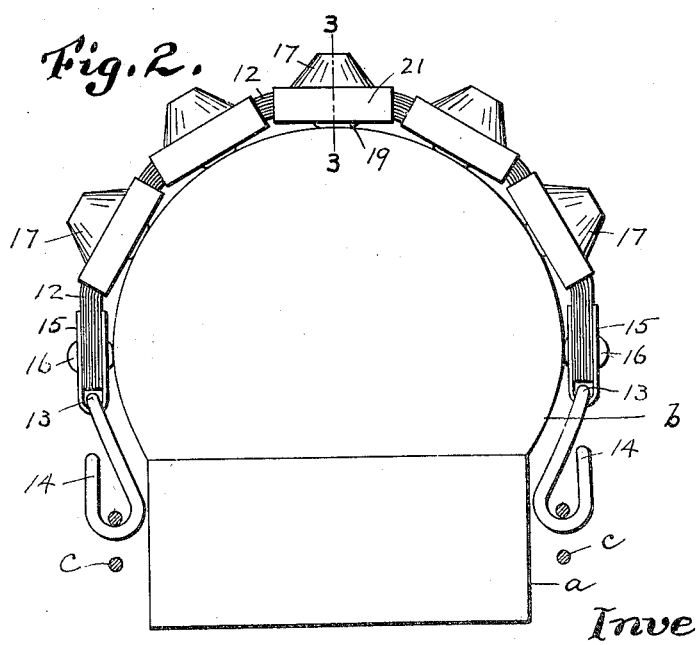
Inventor:  
W. T. Rollins  
by Wright Brown Quimby May  
Attys.

UNITED STATES PATENT OFFICE.

WILLIAM T. ROLLINS, OF BOSTON, MASSACHUSETTS, ASSIGNOR TO RUSSELL CODMAN, JR., OF BOSTON, MASSACHUSETTS.

ANTISKID ATTACHMENT FOR ELASTIC TIRES.

1,423,026.  Specification of Letters Patent.  Patented July 18, 1922.

Application filed March 25, 1922. Serial No. 546,604.

*To all whom it may concern:*

Be it known that I, WILLIAM T. ROLLINS, a citizen of the United States, residing at Boston, in the county of Suffolk and State of Massachusetts, have invented new and useful Improvements in Antiskid Attachments for Elastic Tires, of which the following is a specification.

This invention has for its object to provide a simple, effective and durable attachment for pneumatic and cushioned wheel tires, adapted to be conveniently and securely applied and removed, and presenting a plurality of outwardly projecting independent heads or bosses, adapted to engage a track or road bed, and prevent slipping and skidding of the tire in various directions.

The invention is embodied in the improvements which I will now proceed to describe and claim.

Of the accompanying drawings forming a part of this specification,—

Figure 1 is a side elevation, showing portions of a wheel rim and its tire, and a unit of a complete attachment embodying the invention.

Figure 2 is an edge view of the unit shown by Figure 1, the tire and wheel rim being shown conventionally.

Figure 3 is a section on line 3—3 of Figure 2.

Figure 4 is a section on line 4—4 of Figure 1.

The same reference characters indicate the same parts in all of the figures.

The wheel rim *a* and tire *b* may be of any suitable construction.

An attachment embodying the invention is composed of a plurality of duplicate units, each extending in curved form across a portion of the tread of the tire, and provided at its opposite ends with anchoring devices, adapted to engage chains *c*, or other securing means extending beside opposite edges of the rim, the units being spaced apart, and the entire attachment including any desired number of units.

Each unit is composed of a flexible body strip 12, which may be made of layers of frictioned canvas, or other fabric, united by layers of vulcanized rubber. The anchoring devices may be stout wire rods, bent to form necks 13, and hooks 14, the necks being engaged with sockets formed by the necks of U-shaped sheet metal reinforcing plates 15, attached by rivets 16 to the opposite ends of the body strip. The hooks 14 are adapted to engage links of the chains *c*. Each body strip 12 is provided with a series of flat-sided sheet metal stiffening plates 20, covering the major portion of the outer surface of the strip, said plates being bent at 21 across the longitudinal edges of the strip 12, and having ears 22 bent inwardly under the strip. 17 represents the heads, and 18 the shanks of rivets passing through and uniting the plates 20 and the ears 22 to the strip 12. The heads 17 are of skid-resisting form and project outward from the plates. The shanks of the rivets are upset at their inner ends on the ears to form securing flanges 19. As shown by Figure 3, the flanges of two rivets engaged with each plate, bear on the ears 22, the flange of the intermediate rivet bearing on a washer 23, although if desired, one of the ears 22 may be longer than the other, to receive the shanks of two rivets.

The reinforcing plates 20 are of such width that they cover the major portion of the outer surface of the body strip 12, so that said strip is mainly encased in and protected by metal, the portions of the body strip between the reinforcing plates constituting flexible hinges, permitting the strip to conform to the curvature of the tire. The U-shaped plates 15 supplement at the end portions of the strip 12, the protection afforded by the plates 20.

The rivet heads 17 are preferably frustoconical, so that they are adapted to resist skidding or slipping either circumferentially or sidewise, without objectionably cutting up the road. The plates 20 present flat surfaces surrounding the bases of the rivets, and protecting the major portion of the body strip against wear.

The plates 20, their ears and the rivets constitute a series of strip-stiffening and skid-resisting elements inseparably united with the body strip.

I claim:

An anti-skid attachment unit comprising a flexible body strip of sheet material, adapted to be curved across a portion of a tire tread, and provided at its ends with anchoring devices; and a series of strip-stiffening skid-resisting elements extending transversely across the strip and inseparably united thereto, each of said elements including first, a flat-sided sheet metal plate bearing on the outer side of the body strip, bent across the longitudinal edges of the strip, and having ears bearing on the inner side of the strip, and secondly, a plurality of rivets having skid-resisting heads bearing on the outer surface of the strip, and shanks passing through the plate, the strip, and the plate ears, and upset on the inner sides of said ears, the plates of said elements forming flat surfaces surrounding the bases of the rivet heads and protecting the major portions of the strip, said strips and their ears being spaced apart so that transverse portions of the strip are left flexible, and constitute hinges connecting said elements, and permitting the unit to conform freely to the transverse curvature of the tire tread.

In testimony whereof I have affixed my signature.

WILLIAM T. ROLLINS.